United States Patent
Petersson et al.

(10) Patent No.: US 11,012,129 B2
(45) Date of Patent: May 18, 2021

(54) TRANSMISSION OF REFERENCE SIGNALS FROM A TERMINAL DEVICE

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE); Roy Timo, Järfälla (SE); Xinlin Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/466,533

(22) PCT Filed: Apr. 29, 2019

(86) PCT No.: PCT/EP2019/060944
§ 371 (c)(1),
(2) Date: Jun. 4, 2019

(87) PCT Pub. No.: WO2020/221423
PCT Pub. Date: Nov. 5, 2020

(65) Prior Publication Data
US 2020/0343947 A1 Oct. 29, 2020

(51) Int. Cl.
*H04B 7/04* (2017.01)
*H04B 7/0456* (2017.01)
(Continued)

(52) U.S. Cl.
CPC ......... *H04B 7/0478* (2013.01); *H04B 7/0469* (2013.01); *H04L 1/0003* (2013.01); *H04L 1/0009* (2013.01); *H04W 52/365* (2013.01)

(58) Field of Classification Search
CPC ....... H04L 5/0048; H04L 1/0025; H04L 1/06; H04L 1/0003; H04L 1/0009;
(Continued)

(56) References Cited

U.S. PATENT DOCUMENTS 9,548,803 B2 * 1/2017 Tee .................. H04L 25/03828
2010/0285762 A1 11/2010 Ko et al.
(Continued)

FOREIGN PATENT DOCUMENTS

CN 108111283 A 6/2018

OTHER PUBLICATIONS

3GPP TSG RAN WG1 Meeting #96, R1-1901569, Huawei, Enhancements of UL MIMO with multiple PAs to allow full power transmission, Feb. 25 to Mar. 1, 2019, 7 pages 2019.*
International Search Report issued in International Application No. PCT/EP2019/060944, dated Dec. 16, 2019 (5 pages).
Written Opinion of the ISA issued in International Application No. PCT/EP2019/060944, dated Dec. 16, 2019 (8 pages).
(Continued)

*Primary Examiner* — Rahel Guarino
(74) *Attorney, Agent, or Firm* — Rothwell, Figg, Ernst & Manbeck, P.C.

(57) ABSTRACT

There is provided mechanisms for transmission of reference signals. A method is performed by a terminal device. The terminal device comprises at least two physical antenna ports. Each physical antenna port is fed by its own power amplifier. The method comprises transmitting, in only the physical antenna port is fed by the power amplifier configured for highest total output power of all the power amplifiers, as many uplink reference signals as there are physical antenna ports in total.

20 Claims, 6 Drawing Sheets

(51) Int. Cl.
*H04L 1/00* (2006.01)
*H04W 52/36* (2009.01)

(58) Field of Classification Search
CPC . H04W 52/146; H04W 52/325; H04W 52/34; H04W 52/04; H04W 72/0473; H04W 88/02; H04W 52/18; H04W 52/38; H04W 52/365; H04B 7/0478; H04B 7/0469
See application file for complete search history.

(56) References Cited

U.S. PATENT DOCUMENTS

| | | | | |
|---|---|---|---|---|
| 2012/0287770 A1* | 11/2012 | Iwai | ............... | H04J 13/0074 370/209 |
| 2013/0128833 A1* | 5/2013 | Lee | ............... | H04W 52/545 370/329 |
| 2016/0087701 A1 | 3/2016 | Wu et al. | | |
| 2018/0167252 A1 | 6/2018 | Wang et al. | | |
| 2018/0294847 A1 | 10/2018 | Lee et al. | | |
| 2018/0309490 A1 | 10/2018 | Rahman et al. | | |
| 2019/0007112 A1 | 1/2019 | Faxér et al. | | |
| 2019/0327693 A1* | 10/2019 | Rahman | ............. | H04W 52/362 |
| 2020/0099490 A1* | 3/2020 | Sridharan | ............. | H04L 5/0023 |

OTHER PUBLICATIONS

3GPP TSG RAN WG1 Meeting #96-bis (R1-1904847), Ericsson, "On full power UL transmission", Xi'an, China, Apr. 8-12, 2019 (22 pages).

3GPP TSG-RAN WG1 #87 (R1-1612049), Qualcomm Incorporated, "Views on SRS", Reno, Nevada, Nov. 14-18, 2016 (4 pages).

3GPP TSG RAN WG1 #96bis (R1-1904477), MediaTek Inc., "Full Tx power UL transmission", Xi'an, China, Apr. 8-12, 2019 (17 pages).

3GPP TS, 38.213, V15.2.0 (Jun. 2018), 3rd Generation Partnership Project; Technical Specification Group Radio Access Network; NR; Physical layer procedures for control (Release 15), Jun. 2018 (98 pages).

Qualcom Incorporated, "Full Tx power for UL transmissions", 3GPP TSG RAN WG1 Meeting #94bis, R1-1811279, Chengdu, China, Oct. 8-12, 2018 (10 pages).

Catt, "Consideration on full transmission power of UL", 3GPP TSG RAN WG1 Meeting #94bis, R1-1810557, Chengdu, China, Oct. 8-12, 2018 (7 pages).

Ericsson, "Power control for UL MIMO", 3GPP TSG RAN WG1 Meeting #92bis, R1-1805205, Sanya, China, Apr. 16-20, 2018 (9 pages).

* cited by examiner

TRANSMISSION OF REFERENCE SIGNALS FROM A TERMINAL DEVICE

CROSS REFERENCE TO RELATED APPLICATION(S)

This application is a 35 U.S.C. § 371 National Stage of International Patent Application No. PCT/EP2019/060944, filed Apr. 29, 2019, designating the United States.

TECHNICAL FIELD

Embodiments presented herein relate to a method, a terminal device, a computer program, and a computer program product for transmission of reference signals.

BACKGROUND

In communications networks, there may be a challenge to obtain good performance and capacity for a given communications protocol, its parameters and the physical environment in which the communications network is deployed.

For example, equipping a terminal device with two or more, or even multiple, transmit antennas (where each such antenna is connected to its own physical antenna port at the terminal device) might enable the uplink performance to be increased through higher spectral efficiency and/or improved link budget than allowed for only one single antenna.

Two uplink transmission schemes will be considered next; codebook based (CB) transmission and non-codebook based (NCB) transmission. CB transmission is a feedback based transmission scheme that can be used for frequency division duplex (FDD) as well as for time division duplex (TDD) and for terminal devices without transmitter-receiver reciprocity. NCB transmission is based on reciprocity and can be used in time division duplex (TDD) for UEs with transmitter-receiver reciprocity.

In CB transmission the terminal device first transmits one or two uplink reference signal resources, such as sounding reference signal (SRS) resources, where each resource can have up to four ports. The radio access network node serving the terminal device estimates the uplink radio propagation channel based on the received uplink reference signals, where each uplink reference signal is transmitted from a separate physical antenna port, and determines a suitable transmission rank and precoder for the coming uplink data transmission. The precoder could be selected from a predetermined set of fixed precoders defined in the 3GPP specifications, a so-called codebook, see 3GPP TS 38.211 "NR; Physical channels and modulation", Version 15.5.0. The radio access network node then signals the transmission rank via a transmit rank indicator (TRI) and an index to the determined precoder in the codebook, a so-called transmit precoder matrix indicator (TPMI). The terminal device shall then use the precoder corresponding to the signaled TRI and TPMI in its upcoming uplink transmission of data.

In NCB transmission, the terminal device might perform precoding based on reciprocity that is transparent to the radio access network node. The terminal device might, for example, be configured with a downlink reference signal, such as a channel state information reference signal (CSI-RS) transmitted by the radio access network node that the terminal device measures on to estimate the downlink radio propagation channel. If reciprocity holds, the terminal device can use knowledge of the downlink radio propagation channel to design a precoder for the uplink reference signals and uplink transmission of data. The radio access network node estimates the uplink radio propagation channel based on the uplink reference signals transmitted by the terminal device and selects one or multiple of the uplink reference signal resources that indicates which precoder the terminal device shall use in its upcoming uplink transmission of data. The selected uplink reference signal resources are signaled to the terminal device via a so-called SRS resource indicator (SRI). The terminal device shall then transmit one layer per indicated SRS resource using the corresponding precoder. The transmission rank is thus equal to the number of indicated SRS resources Depending on terminal device implementation, it may be possible to maintain the relative phase of the transmit chains of an antenna array (assuming for example one radio chain per antenna element). In this case, the terminal device is enabled to transmit the same modulation symbol over multiple transmit chains with individual gain and/or phase per transmit chain and in this way forming a beam over the corresponding antenna array. This transmission of a common modulation symbol or signal on multiple antenna elements with controlled phase is referred to as coherent transmission. The support for coherent uplink MIMO transmission in Release 10 of the Long Term Evolution (LTE) suite of telecommunication standards is indicated via a feature group indication for relative transmit phase continuity for uplink spatial multiplexing, wherein a terminal device indicates if it can adequately maintain the relative phase of transmit chains over time in order to support coherent transmission.

In other terminal device implementations, the relative phase of the transmit chains may not be well controlled, and coherent transmission may not be used. In such implementations, it may still be possible for the terminal device to transmit on one of the transmit chains at a time, or to transmit different modulation symbols on the transmit chains. In the latter case, the modulation symbols on each transmit chain may form a spatially multiplexed, or MIMO, layer. This class of transmission is referred to as non-coherent transmission.

In still other terminal device implementations, the relative phase of a subset of the transmit chains is well controlled, but not over all transmit chains. One possible example with respect to multi-panel operation, is where phase is well controlled among transmit chains within a panel, but phase between panels is not well controlled. This class of transmission is referred to as partially-coherent.

All three of these variants of relative phase control have been agreed to be supported for transmission over the 5G NR air interface, and so terminal device capabilities have been defined for full coherence, partial coherence, and non-coherent transmission. Depending on coherence capability of the terminal device, it is possible to configure the terminal device with three different combinations of codebook subsets. FIG. 1 illustrates three different codebook subsets 10, 20, 30 for rank 1 precoders. Codebook subset 10 is referred to as non-coherent and only consists of antenna selection precoders. Codebook subset 20 is referred to as partial-coherent and only consists of antenna pair selection precoders. Codebook subset 30 is referred to as fully-coherent and only consists of full linear combining precoders. Depending on the terminal device coherence capability, the radio access network node can configure the terminal device with three different combinations of the codebook subsets. For non-coherent terminal devices, the radio access network node is expected to configure the terminal device with only the non-coherent codebook subset 10. For partially-coherent terminal devices, the radio access network node is expected to configure the terminal device with both the non-coherent and the partial-coherent codebook subsets 10, 20, and for fully-coherent terminal devices, the radio access network node is expected to configure the terminal device with all three codebook subsets 10, 20, 30.

There might be restrictions in terms of the total output power that a terminal device is allowed to transmit. For example, according to the third generation partnership project (3GPP) a Class 3 terminal device is allowed to transmit a total output power of 23 dBm. For a terminal device with multiple transmit antennas (where each antenna corresponds to a separate physical antenna port) and one power amplifier (PA) per antenna (and thus one PA per physical antenna port) there exists different options of how to dimension the different PAs.

According to a first example each PA is capable of delivering the maximum permitted total output power, hereinafter denoted $P_{cmax}$ (e.g. 23 dBm for a Class 3 terminal device). This means that a single antenna is configured to deliver $P_{cmax}$. This can be useful if only one antenna has good path gain to the radio access network node and the terminal device needs to transmit with full power. This implementation can be suitable for non-coherent terminal devices that transmit one layer per antenna or for terminal devices having directional antennas pointing in different directions. However, due to the restrictions, all PAs cannot simultaneously be delivering the maximum output power. In this sense, this example is an overprovisioning of power which is costly to implement.

According to a second example, for four transmit antennas, each PA is configured only to deliver $P_{cmax}-6$ [dBm]. This implementation can be suitable for coherent terminal devices that perform precoding over all antennas. If a precoder with constant modulus weights is used, a total output power of $P_{cmax}$ can be delivered by such a terminal device. However, $P_{cmax}$ cannot be delivered if not all antennas are transmitting simultaneously.

According to a third example the PA of only a single one of the antennas is configured to deliver $P_{cmax}$ whilst the PAs of the other antennas are configured to deliver $P_{cmax}-6$. This is a cheaper alternative than the first example and still is able to give full output power from a single antenna. One issue with this example is that full output power cannot always be transmitted, e.g., if a precoder is used that does not utilize the antenna that has the high-power PA.

In some aspects, for the uplink transmission of data the transmitted power is scaled by the ratio of the number of physical antenna ports with a non-zero uplink data transmission to the number of configured physical antenna ports for the transmission scheme. This power scaling has the undesired effect that full power uplink transmission is not possible in some cases, e.g., non-full rank transmissions for NCB precoding or CB precoding with non-coherent terminal devices.

For a terminal device with poor link budget, e.g. a terminal device located indoors or at the cell edge, rank-one transmission is preferred in order to maximize the received power at the radio access network node. With CB transmission, a non-coherent terminal device can only perform rank-one transmission using a single antenna according to the codebook shown in FIG. 1. Therefore, there is a need for a non-coherent terminal device to be able to transmit uplink data with full power ($P_{cmax}$) on a single antenna.

One issue with having one high-power PA and multiple low-power PAs as in the above third example is that it is the radio access network node that takes the decision on which physical antenna port the terminal device shall use for the uplink transmission of data and the radio access network node is without information with regards to which physical antenna port that is connected the high-power PA.

Traditionally, a terminal device configured for CB transmission will transmit one uplink reference signal per physical antenna port. Uplink reference signals might therefore be transmitted with higher output power at the physical antenna port connected to the high-power PA. If the channel gain is similar for all the physical antenna ports, the physical antenna port having the high-power PA would then be visible to the radio access network node in the sounding and the radio access network node could select this physical antenna port for upcoming uplink transmission. However, according to the 3GPP specifications the total output power for transmission of the uplink reference signals should be split equally across the physical antenna ports configured for the transmission of the uplink reference signals. This means that the received power at the radio access network node will be the same for all uplink reference signals if the channel gain is the same for all uplink reference signals. Therefore, the uplink reference signal transmitted in the physical antenna port connected to the high-power PA will not give higher received power at the radio access network node than the uplink reference signals transmitted in the physical antenna ports connected to the low-power PAs.

With CB transmission for non-coherent terminal devices having poor link budget, the radio access network node will most likely select a rank-one precoder to be used by the terminal device for upcoming uplink transmission of data. This means that the uplink data will be transmitted only in a single physical antenna port since the only rank-one precoders for non-coherent terminal devices are antenna selection precoders according to FIG. 1. If the average channel gain is similar for all uplink reference signals, the radio access network node might select a physical antenna port with a low-power PA for the uplink transmission of data if this physical antenna port has only slightly higher received power in the sounding. Therefore, there is no guarantee that the terminal device is allowed to use its high-power PA for the upcoming uplink transmission of data when it is needed the most.

Another way could be for the terminal device to be equipped with switches that connect the high-power PA to the physical antenna port with the best channel gain and the other PAs to the other physical antenna ports. However, equipping terminal devices with switches is complex, costly and also gives radio frequency losses.

Hence, there is still a need for mechanisms that could improve the coverage and user throughput for terminal devices in the uplink.

SUMMARY

An object of embodiments herein is to provide an efficient mechanism that improves the coverage and user throughput for terminal devices in the uplink, not suffering from the above noted issues, or at least where the above issues are mitigated or reduced.

According to a first aspect there is presented a method for transmission of reference signals. The method is performed by a terminal device. The terminal device comprises at least two physical antenna ports. Each physical antenna port is fed by its own power amplifier. The method comprises transmitting, in only the physical antenna port is fed by the power amplifier configured for highest total output power of all the power amplifiers, as many uplink reference signals as there are physical antenna ports in total.

According to a second aspect there is presented a terminal device for transmission of reference signals. The terminal device comprises at least two physical antenna ports. Each physical antenna port is fed by its own power amplifier. The terminal device further comprises processing circuitry. The processing circuitry is configured to cause the terminal device to transmit, in only the physical antenna port is fed by the power amplifier configured for highest total output power of all the power amplifiers, as many uplink reference signals as there are physical antenna ports in total.

According to a third aspect there is presented a terminal device for transmission of reference signals. The terminal device comprises at least two physical antenna ports. Each physical antenna port is fed by its own power amplifier. The terminal device further comprises a transmit module configured to transmit, in only the physical antenna port is fed by the power amplifier configured for highest total output power of all the power amplifiers, as many uplink reference signals as there are physical antenna ports in total.

According to a fourth aspect there is presented a computer program for transmission of reference signals, the computer program comprising computer program code which, when run on a terminal device comprising at least two physical antenna ports, wherein each physical antenna port is fed by its own power amplifier, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously the disclosed transmission of reference signals enables improvements of the coverage and user throughput for the terminal device in the uplink.

Advantageously this enables non-coherent terminal devices equipped with one or more high-power PA and one or more low-power PA to be guaranteed to use their high-power PA for rank-one uplink transmission of data.

Advantageously this might allow the output power to, in comparison to state of the art, be increased by 6 dB for a terminal device with four physical antenna ports.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 schematically illustrates precoders;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
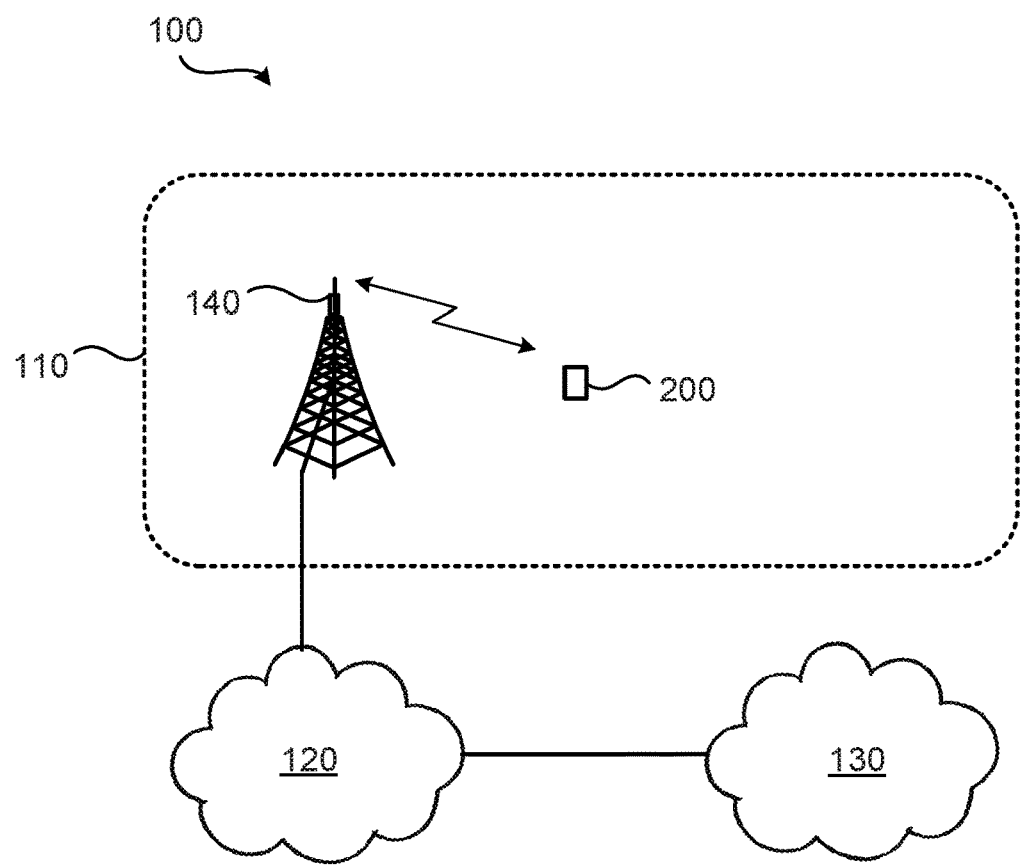
FIG. 2 is a schematic diagram illustrating a communication system according to embodiments.

FIG. 2 is a schematic diagram illustrating a communication system 100 where embodiments presented herein can be applied. The communications system 100 comprises a radio access network node 140 configured to provide network access over one or more radio propagation channels to a terminal device 200 in a radio access network no. Non-limited examples of terminal devices 200 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140 is part of, integrated with, or collocated with a radio base station, base transceiver station, node B, evolved node B, gNB, access point, or the like. The radio access network no is operatively connected to a core network 120. The core network 120 is in turn operatively connected to a packet data network 130, such as the Internet. The terminal device 200 is thereby, via the radio access network node 140, enabled to access services of, and exchange data with, the service network 130.

Figure 3:
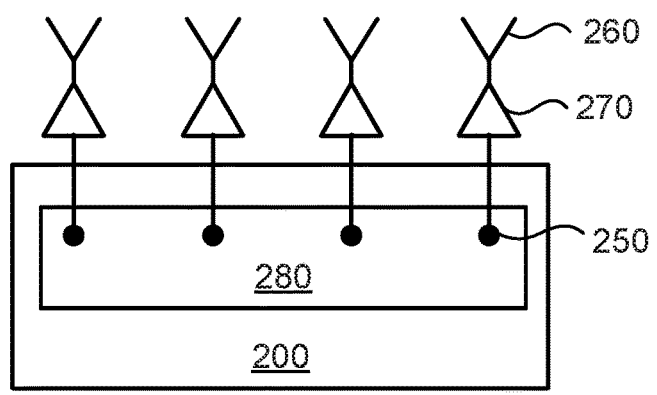
FIG. 3 schematically illustrates a terminal device according to an embodiment.

FIG. 3 schematically illustrates a terminal device 200 equipped with four physical antennas 260. As the skilled person understands, these are just examples and the terminal device 200 might be equipped with more physical antennas 260. Each physical antenna 260 has its own power amplifier (PA) 270. That is, each physical antenna port 250 is fed by its own PA 270. Each physical antenna 260 is connected to baseband circuitry 280 via its own physical antenna port 250. Thereby, when the terminal device 200 transmits reference signals, each of the reference signals comes from a respective one of the physical antenna ports 250. In some aspects the terminal device 200 has four or eight physical antenna ports 250 in total (depending on the number of physical antennas 260). Although each physical antenna 260 in FIG. 3 is illustrated as comprising only one single antenna element, as the skilled person understands, each physical antenna 260 might be implemented as an array of antenna elements. That is, each physical antenna port 250 could be operatively connected to only a single antenna element or an array of at least two antenna elements.

As noted above, there is a need for mechanisms that could improve the coverage and user throughput for terminal devices in the uplink (i.e. from terminal device 200 towards radio access network node 140).

The embodiments disclosed herein therefore relate to mechanisms for transmission of reference signals. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 4:
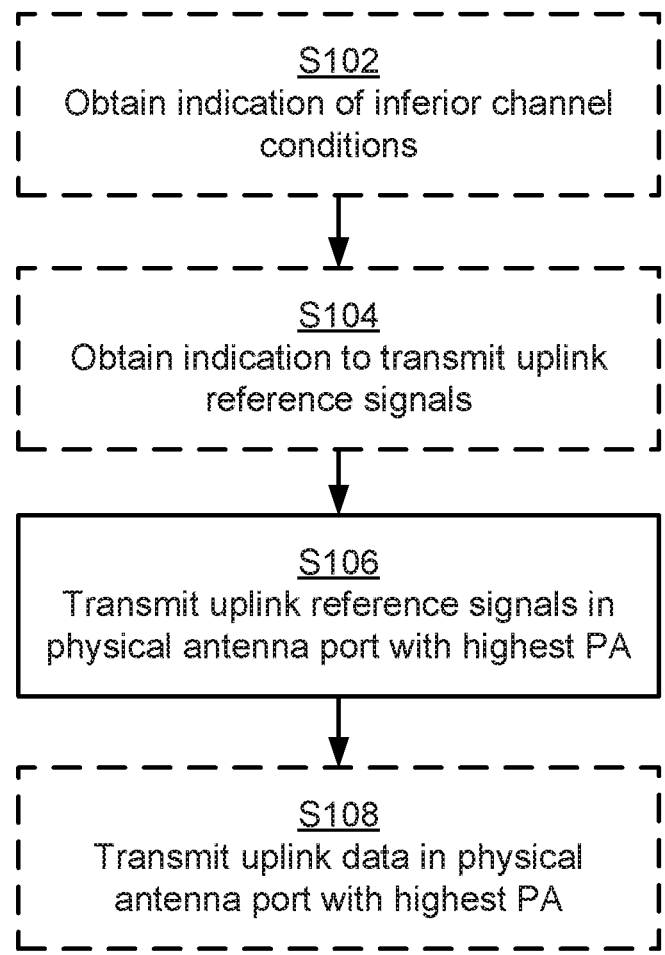
FIG. 4 is a flowchart of methods according to embodiments.

FIG. 4 is a flowchart illustrating embodiments of methods for transmission of reference signals. The methods are performed by the terminal device 200. The terminal device 200 comprises at least two physical antenna ports 250. Each physical antenna port 250 is fed by its own PA 270. The methods are advantageously provided as computer programs 920.

Instead of transmitting one uplink reference signal per physical antenna port the terminal device 200 performs a mapping of the uplink reference signals over the physical antenna ports in a way that enables the terminal device 200 to use full output power for upcoming uplink data transmission using only a single physical antenna port. In order to do so the terminal device 200 transmits all the uplink reference signals in only the physical antenna port 250 having a high-power PA 270. That is, the terminal device 200 is configured to perform step S106:

S106: The terminal device 200 transmits, in only the physical antenna port 250 being fed by the PA 270 configured for highest total output power of all the PAs 270, as many uplink reference signals as there are physical antenna ports 250 in total.

This will guarantee that the radio access network node 140 will select a precoder that makes upcoming uplink data to be transmitted in the physical antenna port 250 having the high-power PA 270.

Figure 5:
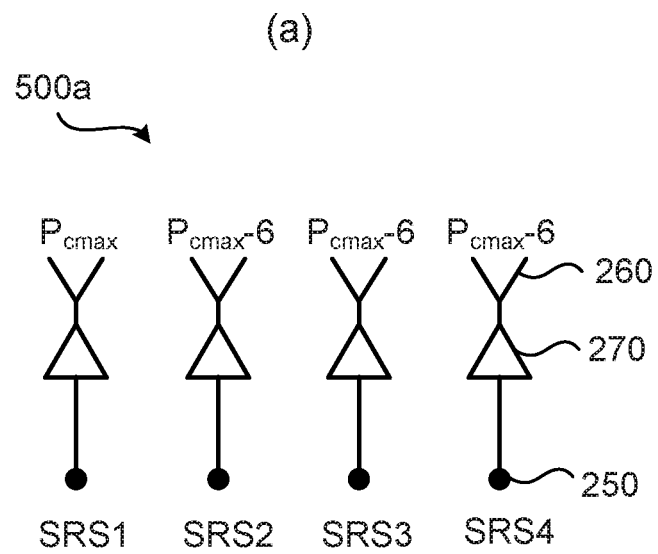
FIG. 5 schematically illustrates transmission of reference signals in antenna ports.
Figure 5:
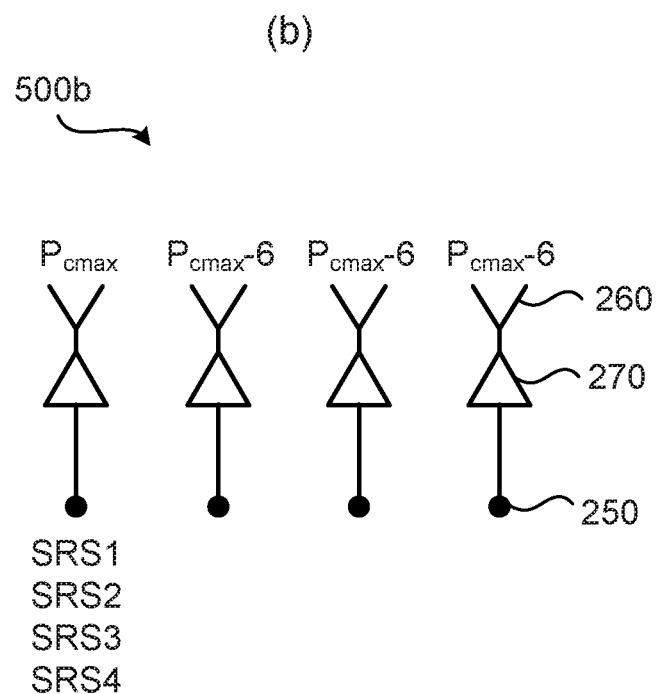

Parallel reference is here made to FIG. 5. FIG. 5 illustrates at (a) transmission of uplink reference signals SRS1, SRS2, SRS3, SRS4 according to prior art and at (b) transmission of the same uplink reference signals SRS1, SRS2, SRS3, SRS4 according to an embodiment as herein disclosed. In both cases there are four physical antenna ports 250, each being connected to one or more antennas 260 via its own PA 270, as in FIG. 3. In the illustrative example of FIG. 5, one of the PAs 270 is configured for highest total output power ($P_{cmax}$ [dBm]) and the remaining PAs 270 are configured for less than the highest total output power ($P_{cmax}-6$ [dBm]). That is, in some examples, as in FIG. 5, only a single one of the PAs 270 is configured for the highest total output power. In other examples, at least two of the PAs 270 are configured for the same highest total output power, but only a single one of the PAs 270 is allowed to use the highest total output power.

According to a further example, the terminal device 200 has only two physical antenna ports 250 where a single one of the two physical antenna ports 250 has a high-power PA and the other has a low-power PA. According to a yet further example, the terminal device 200 has four physical antenna ports 250 where two of the two physical antenna ports 250 each have a high-power PA and the other two each have a low-power PA.

In some examples, at least one of the PAs 270 is configured for a total output power of 23 dBm, representing the highest total output power. That is, in some examples $P_{cmax}=23$ dBm. In some examples at least one of the PAs 270 is configured for a total output power of 17 dBm, not representing the highest total output power. However, as the skilled person, these numerical values are valid for a terminal device 200 having four physical antenna ports 250 and for a terminal device 200 with another number of physical antenna ports 250, the highest total output power might be different. Further, even for a terminal device 200 having four physical antenna ports 250 the numerical values might change due to radio frequency regulatory requirements.

At 500a is illustrated an antenna arrangement where each physical antenna port is fed with its own signal. Hence, one respective individual uplink reference signal is transmitted in each physical antenna port 250. At 500b is illustrated an antenna arrangement where all reference signals SRS1, SRS2, SRS3, SRS4 all are transmitted in only the physical antenna port 250 being fed by the PA 270 configured for highest total output power.

Embodiments relating to further details of transmission of reference signals as performed by the terminal device 200 will now be disclosed.

In some aspects the terminal device 200 is configured for codebook based precoding.

Figure 1:
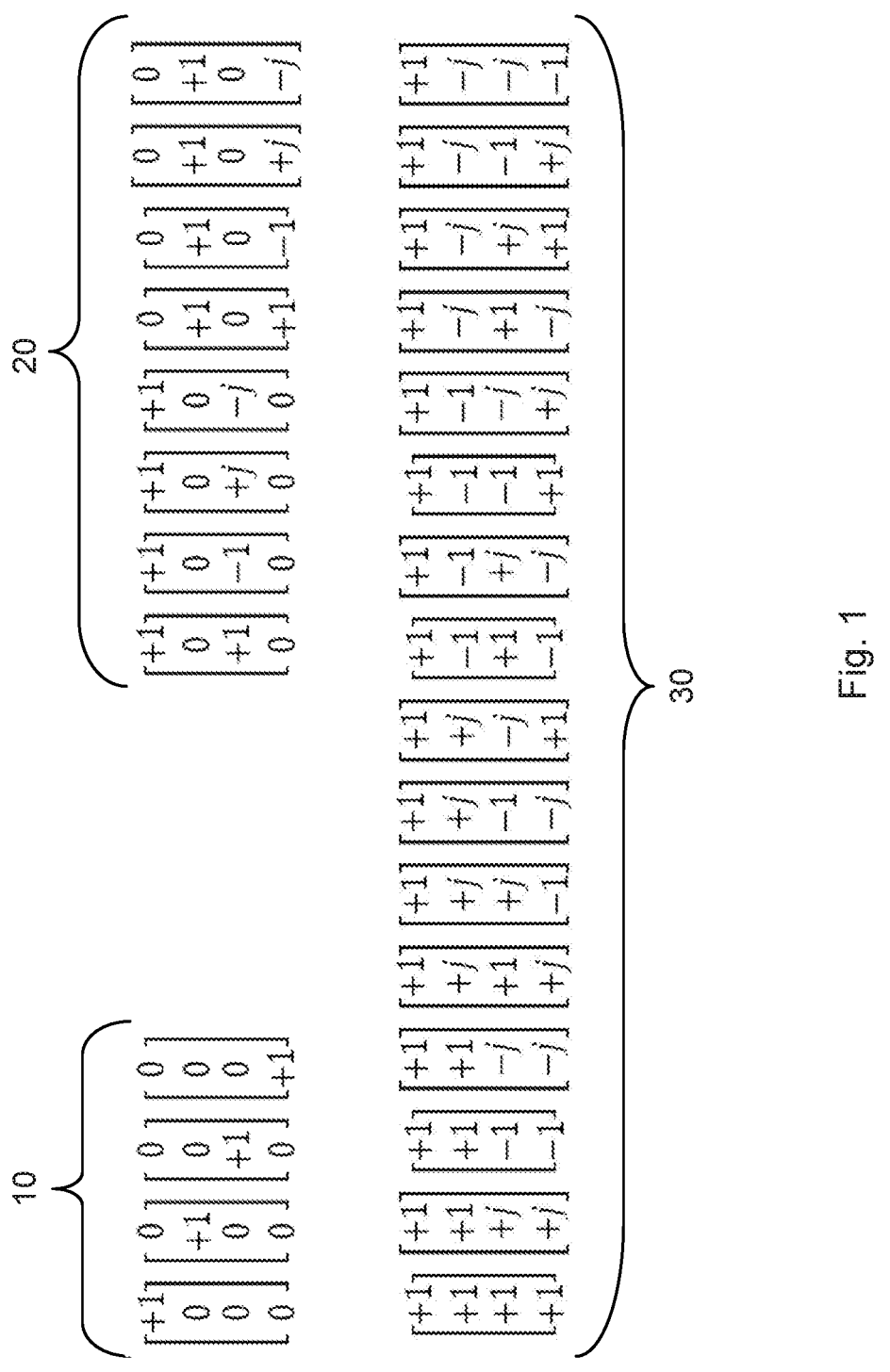

When the terminal device 200 is configured for codebook based precoding it is the uplink data that is transmitted with codebook based precoding. In some aspects, the terminal device 200 is, according to the codebook based precoding, configured to use a codebook subset only consisting of antenna selection precoders. In FIG. 1 this is codebook subset 10 defining antenna selection precoders.

In general terms, the mapping from uplink reference signals to physical antenna ports can be expressed according to a matrix relation. Assume that there are M>1 physical antenna ports 250 in total, and assume that M uplink reference signals SRS 1, SRS 2, ..., SRS M are to be transmitted from M physical antenna ports AP 1, AP 2, ..., AP M. Then, the uplink reference signals SRS 1, SRS 2, ..., SRS M could be mapped to the physical antenna ports AP 1, AP 2, ..., AP M according to:

$$\begin{pmatrix} AP\ 1 \\ AP\ 2 \\ \vdots \\ AP\ M \end{pmatrix} = W \begin{pmatrix} SRS\ 1 \\ SRS\ 2 \\ \vdots \\ SRS\ M \end{pmatrix},$$

where W is an M by M matrix that has all ones in only one single row and all zeros in all other rows. In particular, W is defined such that the row will all ones corresponds to the physical antenna port 250 with the high-power PA 270.

In some aspects, each physical antenna port 250 has its own transmit radio chain, and the terminal device 200 is unable to control relative phase of the transmit radio chains. The terminal device 200 might thus be regarded as being a non-coherent terminal device.

There could be different reasons for the terminal device 200 to transmit the uplink reference signals in the manner defined in step S106.

In some aspects the terminal device 200 is triggered by an indication of inferior physical radio propagation channel conditions to transmit the uplink reference signals. Particularly, according to an embodiment, the terminal device 200 is configured to perform (optional) step S102:

S102: The terminal device 200 obtains an indication of inferior physical radio propagation channel conditions. The uplink reference signals are then transmitted in response thereto. That is, the uplink reference signals are transmitted in step S106 in response to the terminal device 200 having obtained the indication in step S102.

The terminal device 200 might thus determine that it needs to utilize maximum allowed output power on a single antenna in the uplink in order to sustain a reliable communication link to the radio access network node 140. There could be different examples of indications of inferior physical radio propagation channel conditions, and thus of reasons for transmitting the uplink reference signals only on the physical antenna port 250 being fed by the PA 270 configured for highest total output power. Examples thereof will be provided next.

In some examples the uplink reference signals are transmitted in only the physical antenna port 250 being fed by the PA 270 configured for highest total output power of all the PAs 270 in response to at least one of: modulation and coding scheme (MCS) index for uplink transmission is below an MCS index threshold, the radio access network node 140 serving the terminal device 200 has in a previous transmission selected rank-one precoders to be used by the terminal device 200, the number of incorrectly decoded received packets is above an error threshold, the power control of the terminal device 200 has reached its upper output power limit $P_{cmax}$, measurements on downlink reference signals indicate a channel rank being below a channel rank threshold, and received power of downlink reference signals is below a power threshold. These are thus examples of indications of inferior physical radio propagation channel conditions, and thus of reasons for transmitting the uplink reference signals only on the physical antenna port 250 being fed by the PA 270 configured for highest total output power. At least some of these indicators might be based on previous uplink transmissions of data and/or measurements on downlink reference signals.

In some cases, a single indication might not be sufficient in itself to cause the terminal device 200 to transmit the uplink reference signals only on the physical antenna port 250 being fed by the PA 270 configured for highest total output power but instead could require a combination of at least two of the indications. For example, in case of low rank there might also be an indication of low received power since otherwise a strong radio propagation channel with line-of-sight could trigger S106 to be executed. Another example is if the uplink power control has reached $P_{cmax}$. This indication could be combined with information about rank in previous transmissions, estimated channel rank and/or received power on downlink reference signals in order to determine if the terminal devices 200 is to execute S106.

The terminal device 200 might measure the received power of downlink reference signals on a per physical antenna port basis. If the antennas of the physical antenna port 250 with the high-power PA 270 have significantly higher received power than the antennas of the other physical antenna ports 250 due to higher channel gain, there may not be a need to execute S106 and the transmission of uplink reference signals might be performed in a conventional way, since the network node 300 likely is to select a precoder for the terminal device 200 corresponding to the physical antenna port 250 with the high-power PA 270.

In some aspects the terminal device 200 is triggered by the radio access network node 140 to transmit the uplink reference signals. Particularly, according to an embodiment, the terminal device 200 is configured to perform (optional) step S104:

S104: The terminal device 200 obtains an indication from a radio access network node 140 for the terminal device 200 to transmit the uplink reference signals. The uplink reference signals are then transmitted in response thereto. That is, the uplink reference signals are transmitted in step S106 in response to the terminal device 200 having obtained the indication in step S104.

When S106 is executed, the same radio propagation channel to the radio access network node 140 will be experienced for all uplink reference signals. If the different uplink reference signals are transmitted on different combs on interleaved subcarriers or orthogonal frequency-division multiplexing (OFDM) symbols the channel coefficients will be slightly different, but the average channel gain will be the same. The radio access network node 140 will therefore select a rank-one precoder and for a non-coherent terminal device 200 this will be an antenna selection precoder as defined by codebook subset 10 in FIG. 1. It does not matter which TPMI the radio access network node 140 selects since all uplink reference signals are mapped to the physical antenna port with the high-power PA. In this way, the terminal device 200 is guaranteed to transmit uplink data in the physical antenna port 250 with the high-power PA 270.

In some aspects, uplink data transmission from the terminal device 200 following the transmission of the reference signals will thus utilize only the physical antenna port 250 being fed by the PA 270 configured for highest total output power. Particularly, according to an embodiment, the terminal device 200 is configured to perform (optional) step S108:

S108: The terminal device 200 transmits, in only the physical antenna port 250 being fed by the PA 270 configured for highest total output power of all the PAs 270, uplink data.

There could be different examples of uplink data. In some examples the uplink data is transmitted on a physical uplink shared channel (PUSCH). A non-coherent terminal device 200 might thus transmit PUSCH in only the physical antenna port 250 being fed by the PA 270 configured for highest total output power.

There could be different examples of uplink reference signals. According to an example, the uplink reference signals are sounding reference signals (SRS). In some aspects the uplink reference signals are transmitted over the 5G NR air interface.

Figure 6:
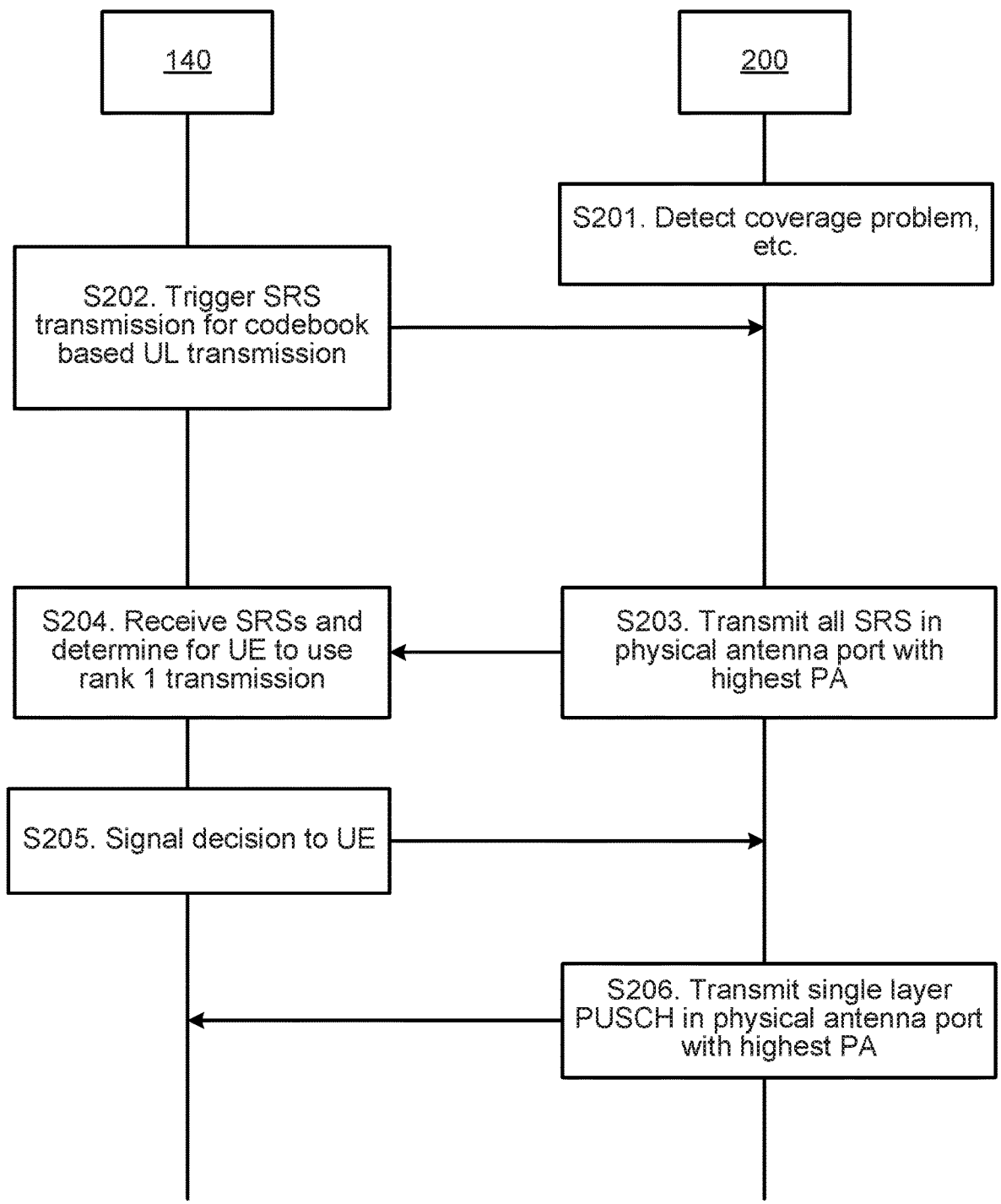
FIG. 6 is a signalling diagram of a method according to an embodiment.

One particular embodiment for transmission of reference signals based on at least some of the above disclosed embodiments will now be disclosed with reference to the signalling diagram of FIG. 6.

S201: The terminal device 200 detects, by obtaining an indication of inferior physical radio propagation channel conditions, that it is experiencing coverage problems. The terminal device 200 would thus benefit from maximizing the output power whilst applying single layer transmission.

S202: The radio access network node 140 triggers the terminal device 200 to transmit the uplink reference signals for upcoming codebook based uplink transmission of data.

S203: The terminal device 200 transmits, in only the physical antenna port 250 being fed by the PA 270 configured for highest total output power of all the PAs 270, as many uplink reference signals as there are physical antenna polls 250 in total.

S204: The radio access network node 140, upon reception of the uplink reference signals, selects a non-coherent precoder that when applied by the terminal device 200 will result in rank 1 transmission and thus enables the terminal device 200 to select the physical antenna port with the PA 270 capable of highest output power.

S205: The radio access network node 140 signals a decision of the selected precoder and MCS to the terminal device 200 in a CSI report, or only the selected precoder in a TPMI report.

S206: The terminal device 200 applies the selected precoder when transmitting the uplink data such that the uplink data is transmitted in only the physical antenna port 250 being fed by the PA 270 configured for highest total output power of all the PAs 270.

Figure 7:
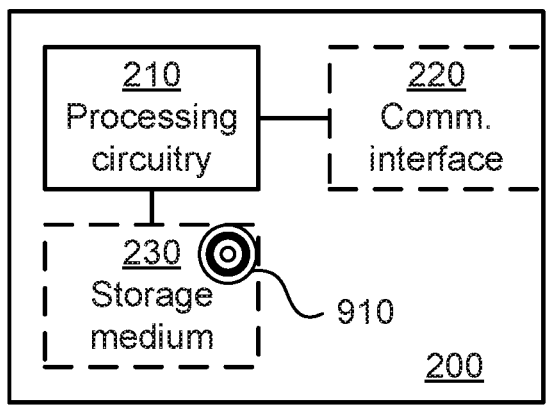
FIG. 7 is a schematic diagram showing functional units of a terminal device according to an embodiment.

FIG. 7 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, functions, and devices of the communication system 100. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 8:
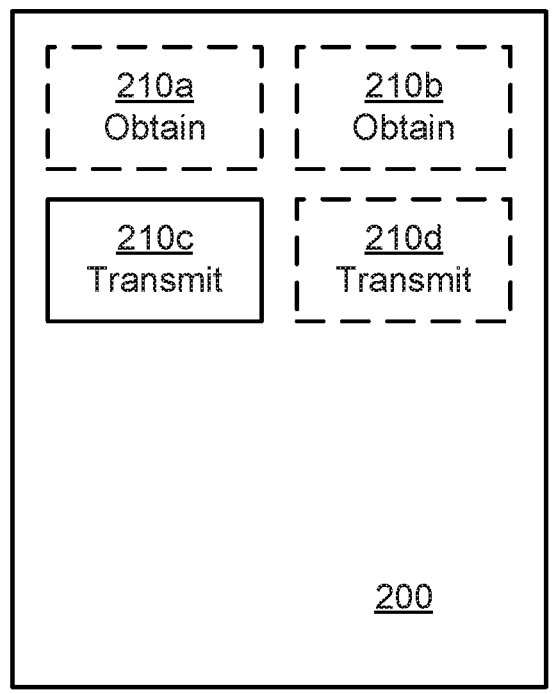
FIG. 8 is a schematic diagram showing functional modules of a terminal device according to an embodiment.

FIG. 8 schematically illustrates, in terms of a number of functional modules, the components of a terminal device 200 according to an embodiment. The terminal device 200 of FIG. 8 comprises a transmit module 210C configured to perform step S106. The terminal device 200 of FIG. 8 may further comprise a number of optional functional modules, such as any of an obtain module 210a configured to perform step S102, an obtain module 210b configured to perform step S104, and a transmit module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

Examples of terminal devices 200 have been given above.

Figure 9:
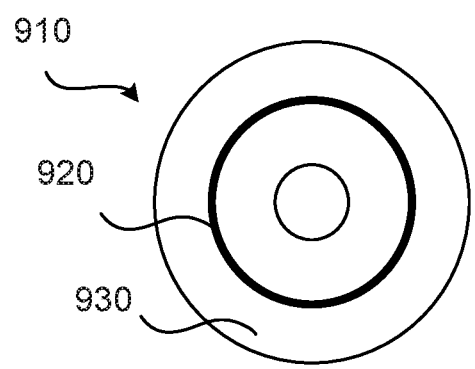
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of reference signals, the method being performed by a terminal device, the terminal device comprising N physical antenna ports, wherein each one of the N physical antenna ports is fed by its own power amplifier, the method comprising:

transmitting N reference signals in only the physical antenna port being fed by the power amplifier configured for highest total output power of all the power amplifiers, where N is a whole number greater than or equal to 2.

2. The method of claim 1, wherein the terminal device is configured for codebook based precoding.

3. The method of claim 2, wherein the terminal device is, according to the codebook based precoding, configured to use a codebook subset only consisting of antenna selection precoders.

4. The method of claim 1, wherein each physical antenna port has its own transmit radio chain, and wherein the terminal device is unable to control relative phase of the transmit radio chains.

5. The method of claim 1, wherein at least one of the power amplifiers is configured for a total output power of 23 dBm, representing said highest total output power.

6. The method of claim 1, wherein at least one of the power amplifiers is configured for a total output power of 17 dBm, not representing said highest total output power.

7. The method of claim 1, wherein each physical antenna port is operatively connected, via its own power amplifier, to only a single antenna element or an array of at least two antenna elements.

8. The method of claim 1, wherein the reference signals are sounding reference signals (SRS).

9. The method of claim 1, wherein the reference signals are transmitted in only the physical antenna port being fed by the power amplifier configured for highest total output power of all the power amplifiers in response to at least one of:
modulation and coding scheme (MCS) index for uplink transmission having below an MCS index threshold,
a radio access network node serving the terminal device in a previous transmission having selected rank-one precoders to be used by the terminal device,
number of incorrectly decoded received packets being above an error threshold,
power control of the terminal device has reached its upper output power limit,
measurements on downlink reference signals indicate channel rank being below a channel rank threshold, or
received power of downlink reference signals being below a power threshold.

10. The method of claim 1, further comprising:
obtaining an indication of inferior physical radio propagation channel conditions, wherein transmitting said reference signals in only the physical antenna port being fed by the power amplifier configured for highest total output power of all the power amplifiers is based at least on the result of obtaining the indication.

11. The method of claim 1, further comprising:
obtaining an indication from a radio access network node for the terminal device to transmit the reference signals, wherein transmitting said reference signals in only the physical antenna port being fed by the power amplifier configured for highest total output power of all the power amplifiers is based at least on the result of obtaining the indication.

12. The method of claim 1, further comprising:
transmitting, in only the physical antenna port being fed by the power amplifier configured for highest total output power of all the power amplifiers, uplink data.

13. The method of claim 12, wherein the uplink data is transmitted on a physical uplink shared channel (PUSCH).

14. The method of claim 12, wherein the reference signals are transmitted over the 5G New Radio (NR) air interface.

15. The method of claim 1, wherein only a single one of the power amplifiers is configured for the highest total output power.

16. The method of claim 1, wherein at least two of the power amplifiers are configured for the same highest total output power, but only a single one of the power amplifiers is allowed to use the highest total output power.

17. A terminal device for transmission of reference signals, the terminal device comprising N physical antenna ports, wherein each one of the N physical antenna ports is fed by its own power amplifier, the terminal device further comprising processing circuitry, the processing circuitry being configured to cause the terminal device to:
transmit N reference signals in only the physical antenna port being fed by the power amplifier configured for highest total output power of all the power amplifiers, where N is a whole number greater than or equal to 2.

18. The terminal device of claim 17, further being configured to use codebook based precoding.

19. A computer program product comprising a non-transitory computer readable medium storing a computer program, the computer program comprising computer code which, when run on processing circuitry of a terminal device comprising N physical antenna ports, wherein each one of the N physical antenna ports is fed by its own power amplifier, causes the terminal device to:
transmit N reference signals in only the physical antenna port being fed by the power amplifier configured for highest total output power of all the power amplifiers, where N is a whole number greater than or equal to 2.

20. A terminal device comprising:
N physical antenna ports, wherein N is greater than 1;
N power amplifiers, wherein each one of the N power amplifiers feeds a different one of the N physical antenna ports and each one of the N power amplifiers has a configured total output power; and
processing circuitry, wherein the terminal device is configured to:
select, from among said N physical antenna ports, the physical antenna port that is fed by the power amplifier having the highest configured total output power among the N power amplifiers, and
transmit N reference signals using only the selected physical antenna port.

* * * * *